US009619844B2

(12) United States Patent
Al-Harthi

(10) Patent No.: US 9,619,844 B2
(45) Date of Patent: Apr. 11, 2017

(54) SYSTEMS AND METHODS FOR THE REPORTING OF SOCIAL INCIDENTS, INTERESTS, AND/OR SERVICES

(75) Inventor: Saleh Al-Harthi, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 1228 days.

(21) Appl. No.: 13/483,537

(22) Filed: May 30, 2012

(65) Prior Publication Data

US 2013/0325943 A1 Dec. 5, 2013

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC ....................................................... G06F 15/16
USPC ................................ 709/204, 205, 221, 229
See application file for complete search history.

(56) References Cited

U.S. PATENT DOCUMENTS 7,411,493 B2 8/2008 Smith
2003/0023476 A1 1/2003 Gainey
2003/0194350 A1 10/2003 Stamatelos et al.
2004/0039990 A1* 2/2004 Bakar .................. G06F 17/243 715/222
2007/0155360 A1 7/2007 An
2007/0296574 A1 12/2007 Smith et al.
2009/0216860 A1* 8/2009 Li et al. ........................ 709/219
2011/0191417 A1* 8/2011 Rathod ........................ 709/204
2011/0217958 A1 9/2011 Kiesel
2011/0289161 A1* 11/2011 Rankin, Jr. .......... G06Q 10/107 709/206

FOREIGN PATENT DOCUMENTS

WO WO-2011/054029 5/2011

OTHER PUBLICATIONS

Qin, Xiaohu et al., "The Discrete Model for Incident Detection Using Mobile Phones", IEEE, Apr. 4, 2003, p. 423-425.

* cited by examiner

*Primary Examiner* — David Lazaro
*Assistant Examiner* — Zia Khurshid
(74) *Attorney, Agent, or Firm* — Andrew M. Calderon; Roberts, Mlotkowski, Safran, Cole & Calderon, P.C.

(57) ABSTRACT

Systems and methods are provided for a user to generate content that reports social incidents, interests, and/or services. Specifically, a method is provided including subscribing with a server to send and receive information or data regarding a social incident, interest, and/or service of interest to a beneficiary. The method further includes defining a template for a report on the server to capture the information or data. The method further includes viewing and/or retrieving the report submitted by a user (via a client) of the general public that perceived the social incident, interest, and/or service of interest to the beneficiary. The defining the template comprises defining at least one information component that the beneficiary may be interested in receiving from the user regarding the social incident, interest, and/or service, and associating the defined template to the beneficiary.

20 Claims, 8 Drawing Sheets

SYSTEMS AND METHODS FOR THE REPORTING OF SOCIAL INCIDENTS, INTERESTS, AND/OR SERVICES

FIELD OF THE INVENTION

The invention generally relates to user generated content, and in particular, to systems and methods for a user to generate content that reports social incidents, interests, and/or services.

BACKGROUND

User generated content (UGC) is currently one of the fastest growing forms of content on the Internet and has fundamentally altered how people add and share content with one another. In particular, UGC refers to any material created and uploaded to the Internet by the general public rather than paid professionals and experts in the field, whether it is a consumer review, a forum post, a blog, a tweet, a wiki, or a personal web page. The advent of UGC has made the Internet a more interactive medium, allowing users to actively participate in the creation of website content.

Like mainstream media, UGC offers a wide variety of news and editorials. The contribution of news through UGC by the general public or "citizen journalism" as it is commonly known is a growing phenomenon. For example, audiences witnessing incidents can post eyewitness accounts on the Internet as soon as they happen or send reports and photos to the media. There are even specific applications and web sites that have been developed to promote the reporting of social incidents such as accidents, weather, traffic jams, and infrastructure damage such that responsible parties or parties potentially impacted by the incident may take action. However, there is currently no solution to harness the power of the general public knowledge via UGC that can work with substantially any type of report and can be customized for each responsible party or party potentially impacted by the incident.

Additionally, with no ethics and media laws to worry about, unlike professional journalists in the mainstream media, citizen journalists can offer unmediated and anonymous debate and analysis of issues. Thus, a fundamental problem of citizen journalism for the reporting of social incidents, interests, and services is the ability to hide behind anonymity and potentially feed opinion or false information as fact into the media.

Accordingly, there exists a need in the art to overcome the deficiencies and limitations described hereinabove.

SUMMARY

In a first aspect of the invention, a method is provided which is implemented in a computer infrastructure having computer executable code embodied on a computer readable storage medium having programming instructions. The method comprises subscribing with a server to receive information or data regarding a social incident, interest, and/or service of interest to a beneficiary. The method further comprises defining a template for a report on the server to capture the information or data. The method further comprises viewing and/or retrieving the report submitted by a user of the general public that perceived the social incident, interest, and/or service of interest to the beneficiary. The defining the template comprises defining at least one information component that the beneficiary may be interested in receiving from the user regarding the social incident, interest, and/or service, and associating the defined template to the beneficiary.

In another aspect of the invention, a method is provided which is implemented in a computer infrastructure having computer executable code embodied on a computer readable storage medium having programming instructions. The method comprises providing an account to a beneficiary. The method further comprises providing an application to a user that facilitates reporting of a social incident, interest, and/or service by the user. The method further comprises receiving a report from the user that includes information or data regarding the social incident, interest, and/or service. The method further comprises providing access to the report or sending the report to the beneficiary. A computing device is configured to perform providing the application, the receiving the report, and the providing or sending the report.

In another aspect of the invention, a system is provided comprising at least one server configured to provide at least one template for obtaining information or data pertaining to a social incident, interest, and/or service. The at least one server is further configured to receive a report generated using an application on a client, wherein the application includes the at least one template and the report includes the information or data. The at least one server is further configured to process the information or data included in the report. The at least one server is further configured to provide the report to a beneficiary that generated the at least one template.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1A:
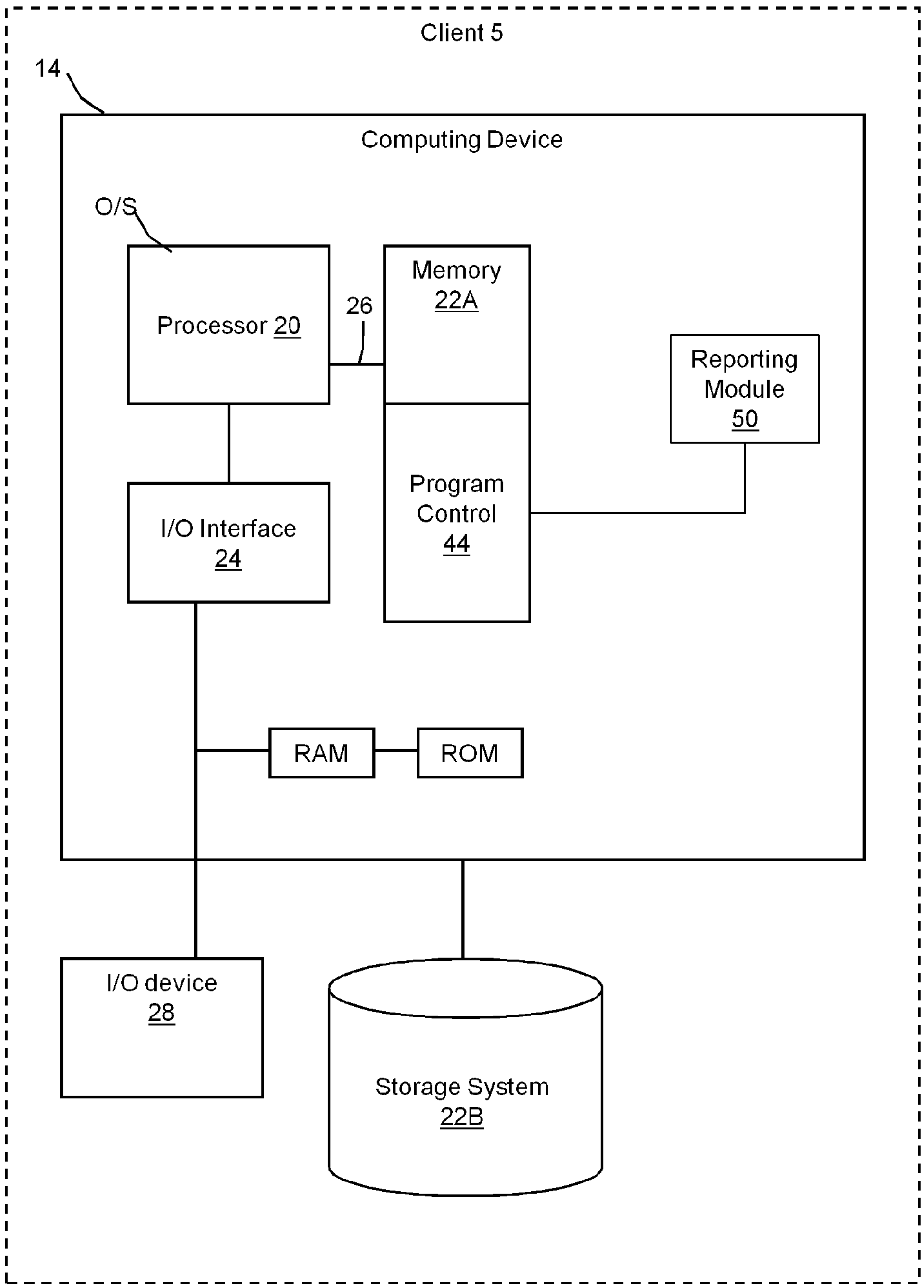
FIGS. 1*a*, 1*b*, and 2 are illustrative external environments for implementing the invention in accordance with aspects of the invention.

The invention generally relates to user generated content, and in particular, to systems and methods for a user to generate content that reports social incidents, interests, and/or services. More specifically, the invention relates to a system, method or computer program product that facilitates the general public (or an exclusive group of users) to report incidents, interests, and/or services to groups of people or a beneficiary. The beneficiary could be family, friends, entities, and/or authorities, service provider, or a group of people defined by the user as a "beneficiary" of the reports. In accordance with aspects of the invention, each member of the general public is perceived as a potential sensor for detecting a social incident, interest, and/or service.

For example in embodiments, each member of the general public may have a mobile device configured to receive input from a user and/or from the environment (e.g., cameras, sensors (temperature, speed, etc.) etc.) regarding a social incident, interest, and/or service perceived by the user or the sensor and transmit the input data to a server. In embodiments, the server may be configured to process the input data, interact with other systems or servers, trigger actions, generate warnings, and provide access to the input data or results of the server processing and triggering the actions to groups of people interested in the perceived social incident, interest, and/or service or information or actions pertaining to them. In embodiments, the server may be created, maintained, deployed, supported, etc. by a service provider, e.g., a Reporting Entity, as discussed in detail below.

Implementations of the present invention provide a mechanism for the general public to participate with groups of people in unprecedented ways. For example, the general public can report efficiently, quickly, and in a distributed manner, any type of incident, interest, and/or service such as travel events, family and friend events, traffic incidents, high prices, damaged property, commercial fraud, health hazards, weather hazards, criminal activity, etc. Additionally, implementations of the present invention provide a mechanism for the general public to receive data, results, or updates from the server side, closing the "feedback" loop, which allows for more powerful applications like authorities instructing the general public or providing information of interest to the general public.

More specifically, implementations of the invention may include, as examples, (i) a user uploading video and other data (e.g., a license plate number of a vehicle involved in an accident) pertaining to a traffic accident to report the accident to a traffic department, an insurance agency, news agencies and/or emergency responders, (ii) a user reporting vandalism in an urban environment to a responsible authority having access to the report and statistics for similar vandalism in the urban environment generated from similar reports, (iii) a user reporting information pertaining to criminal activity, e.g., information related to an issued amber alter, the police accessing the report and contacting the reporting user for further details, or (iv) a user on vacation reporting information about their journey to a closed group of interested friends. Advantageously, the reporting systems and processes of the present invention are user friendly, reliable, mobile, and customizable to serve any group of people.

System Environment

The present invention may be embodied as a system, method, or computer program product. The present invention may take the form of a hardware embodiment, a software embodiment or a combination of software and hardware. Furthermore, the present invention may take the form of a computer program product embodied in any tangible storage of expression having computer-usable program code embodied in the medium. The computer-usable or computer-readable medium may be any medium that can contain, store, or communicate, for use by or in connection with the instruction execution system, apparatus, or device. The computer-usable or computer-readable medium may be, for example, an electronic, magnetic, optical, electromagnetic, infrared, or semiconductor system, apparatus, or device.

Any combination of one or more computer readable medium(s) may be utilized. The computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

FIG. **1*a* shows a client or other computing system 5, e.g., a mobile device, a laptop, a kiosk, a personal computer, etc., that can perform the processes described herein. The client 5 includes a computing device 14, which can be resident on a network infrastructure. The computing device 14 includes a processor 20, memory 22A, an I/O interface 24, and a bus 26**. In addition, the computing device includes random access memory (RAM), a read-only memory (ROM), and an operating system (O/S).

The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention such as, for example, translating a text-based command assigned to a service command configured to control a service, into the service command, as will be discussed below.

In embodiments, the computing device 14 can include a reporting module 50 that may be a portion of the computer program code. Alternatively, the reporting module 50 may be located in computer program code of another computing device. By way of non-limiting example, the reporting module 50 can be located on any client device. Further, for example, the reporting module 50 can be implemented as a Graphical User Interface (GUI) application in a client device that can translate GUI commands into text-based commands; a standalone application in a client device; and/or a gadget on a computer desktop or in a web site.

The reporting module 50 performs processes of the invention, for example, installation of a reporting system, sign-up to the reporting system, input of a reporting, generation of a report, transmission of the report, and receipt of feedback, as described in detail below, and the reporting module 50 can be its own dedicated special processor or a combination thereof.

FIG. **1*b* shows an illustrative environment 10 for managing processes in accordance with the invention. The environment 10 includes a server or other computing system 12 that can perform the processes described herein. The server 12 includes a computing device 14', which can be resident on a network infrastructure. The computing device 14' includes a processor 20', memory 22A', an I/O interface 24', and a bus 26'. The I/O interface 24' enables the server 12' to communicate with one or more other computing devices, e.g., a computing device comprising reporting module 50**, using any type of communications link, as discussed herein.

In addition, the computing device includes random access memory (RAM), a read-only memory (ROM), and an operating system (O/S).

The computing device 14' is in communication with the external I/O device/resource 28' and the storage system 22B'. The I/O device 28' can comprise any device that enables an individual to interact with the computing device 14' (e.g., user interface) or any device that enables the computing device 14' to communicate with one or more other computing devices using any type of communications link.

The processor 20' executes computer program code (e.g., program control 44'), which can be stored in the memory 22A' and/or storage system 22B'. While executing the computer program code, the processor 20' can read and/or write data to/from memory 22A', storage system 22B', and/or I/O interface 24'.

In embodiments, the invention provides a business method that performs the steps of the invention on a subscription, advertising, and/or fee basis. That is, a service provider, such as the Reporting Entity, could offer to perform the processes described herein, such as, for example, provide and analyze reports of social incidents, interests, and/or services to interested groups of people. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties. In further embodiments, the server and the software/applications on the client may be designed and managed for free or for a fee by the beneficiary or by the independent entity, e.g., the Reporting Entity.

Figure 2:
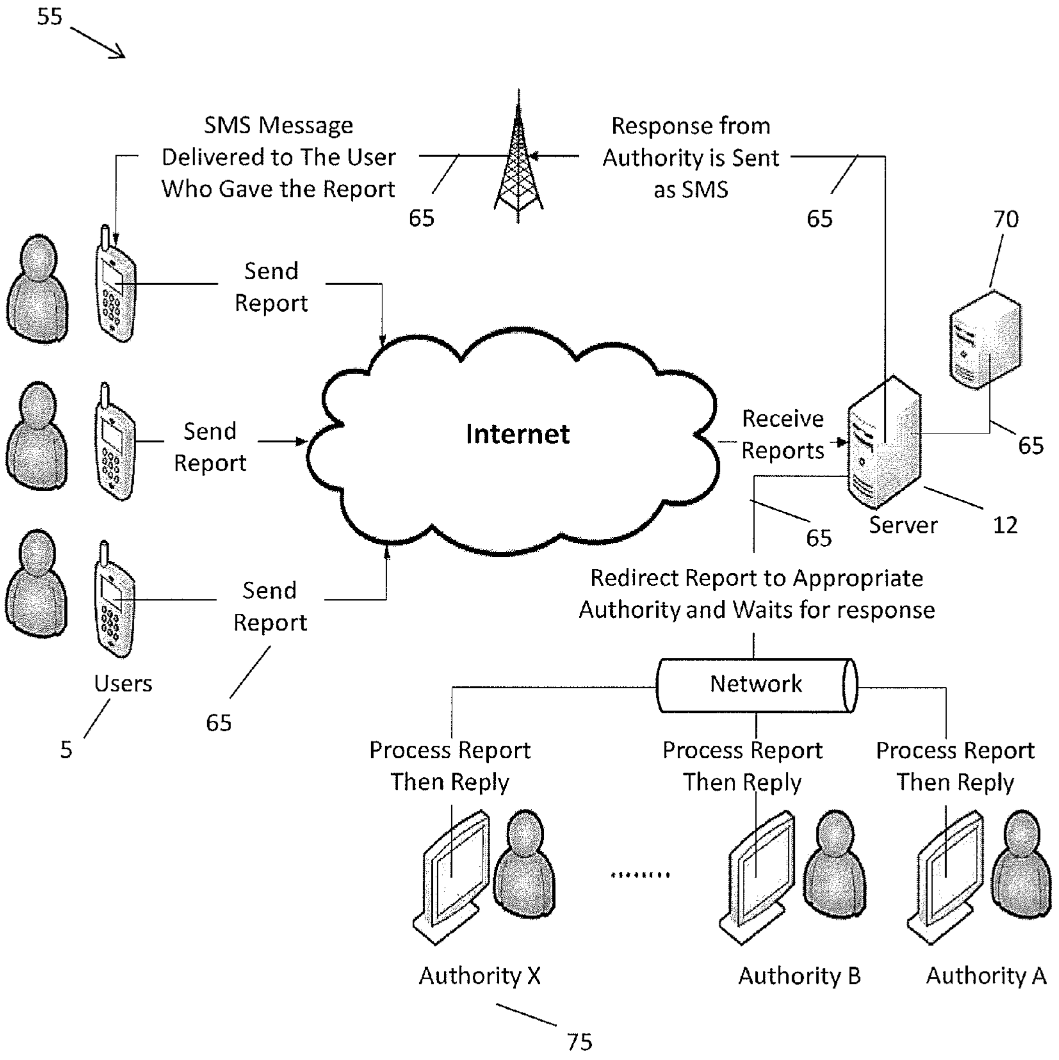

FIG. 2 shows a system 55 for reporting social incidents, interests, and/or services to interested groups of people in accordance with aspects of the invention. In embodiments, the system 55 comprises end points 5, e.g., the client 5, which comprises a computing device 14 such as for example, that described with respect to FIG. 1*a*. More specifically, the end points 5 can be mobile devices, e.g., a mobile phone, PDA, tablets, laptops, etc., a personal computer, or a computing device fixed to an infrastructure, e.g., a kiosk. The end points 5 can be configured to perform as sensors in the general public that gather information or data regarding social incidents, interests, and/or services. In embodiments, the endpoints 5 are configured to receive input data (e.g., information pertaining to social incidents, interests, and/or services) from users who are generating reports. The reports may be generated by the users on the end points 5 via a software application, e.g., the reporting module 50, discussed with respect to FIG. 1*a*, as discussed in further detail below. Moreover, although three end points 5 are shown, there may be any number of end points 5 used to gather the information or data.

Figure 1B:
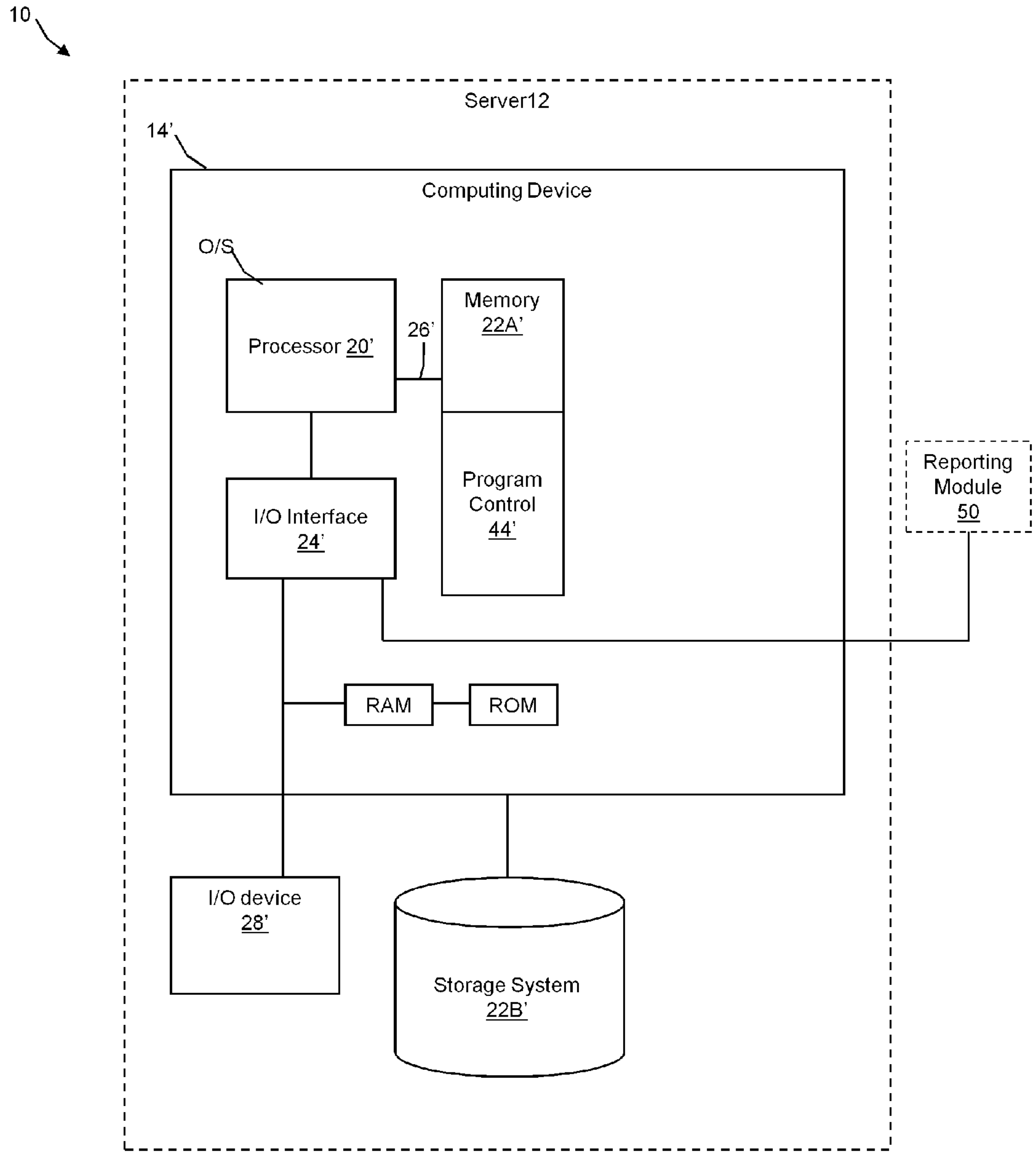

The end points 5 communicate the gathered information or data via communication channels 65 with a server 12, e.g., the server 12, which includes at least one computing device 14' such as that described with respect to FIG. 1*b*. The server 12 may be configured to store and analyze the gathered information or data. In embodiments, the server 12 may be created, maintained, deployed, supported, etc. by a service provider, e.g., the Reporting Entity, as discussed above. Although one server is shown, the invention is not limited to this number, and any suitable number of servers may be used with the invention. The server 12 may be connected via any type of network (wire or wireless), e.g., communication channels 65, to other servers or systems 70 to trigger any desired actions by those systems based on automatic triggers in server 12 or based on manual intervention from a user of system 55. Illustrative and non-limiting examples of such systems are warning systems, security systems, control systems, and information dissemination systems.

The server 12 communicates via communication channels 65 with at least one beneficiary 75, e.g., a group of people such as an authority, that have an interest in accessing and receiving the information or data input received from the end points 5 and stored on the server 12. In embodiments, each beneficiary 75 may subscribe to the server 12 prior to the server 12 enabling users, e.g., end points 5, to report social incidents, interests, and/or services to the beneficiary 75. For example, each beneficiary 75 may subscribe to the server 12 through a service provider, e.g., the Reporting Entity, as discussed above. During the subscription process, the beneficiary may specify the type of reports that they need or are interested in receiving or viewing. Although three beneficiaries are shown, the invention is not limited to this number, and any suitable number of beneficiaries may be subscribed with the invention.

The communication channels 65 connect the end points 5, the server 12, the other servers or systems 70, and/or the at least one beneficiary 75. In some embodiments, communications channels 65 can be a direct link, such as an analog, a serial or a parallel interface. In other embodiments, communication channels 65 can be a shared, public, private, or peer-to-peer network, encompassing any wide or local area network, such as an extranet, an intranet, the Internet, a Local Area Network (LAN), a Wide Area Network (WAN), a virtual private network (VPN), a voice over internet packet network (VoIP) a public switched telephone network (PSTN), an Integrated Services Digital Network (ISDN), or any other form of wired or wireless communication network that is appropriately secured to, for example, meet any regulatory requirements.

Further, communication channels 65 can be compatible with any type of communications protocol used by the components of system environment 55 to exchange data, such as the Ethernet protocol, ATM protocol, short message service (SMS), multimedia messaging service (MMS), Transmission Control/Internet Protocol (TCP/IP), Hypertext Transfer Protocol (HTTP), Hypertext Transfer Protocol Secure (HTTPS), or peer-to-peer protocol. The particular composition and protocol of communication channels 65 is not critical as long as it allows for communication between end users 5, server 12, the other servers or systems 70, and/or the beneficiary 75.

Reports

Figure 3:
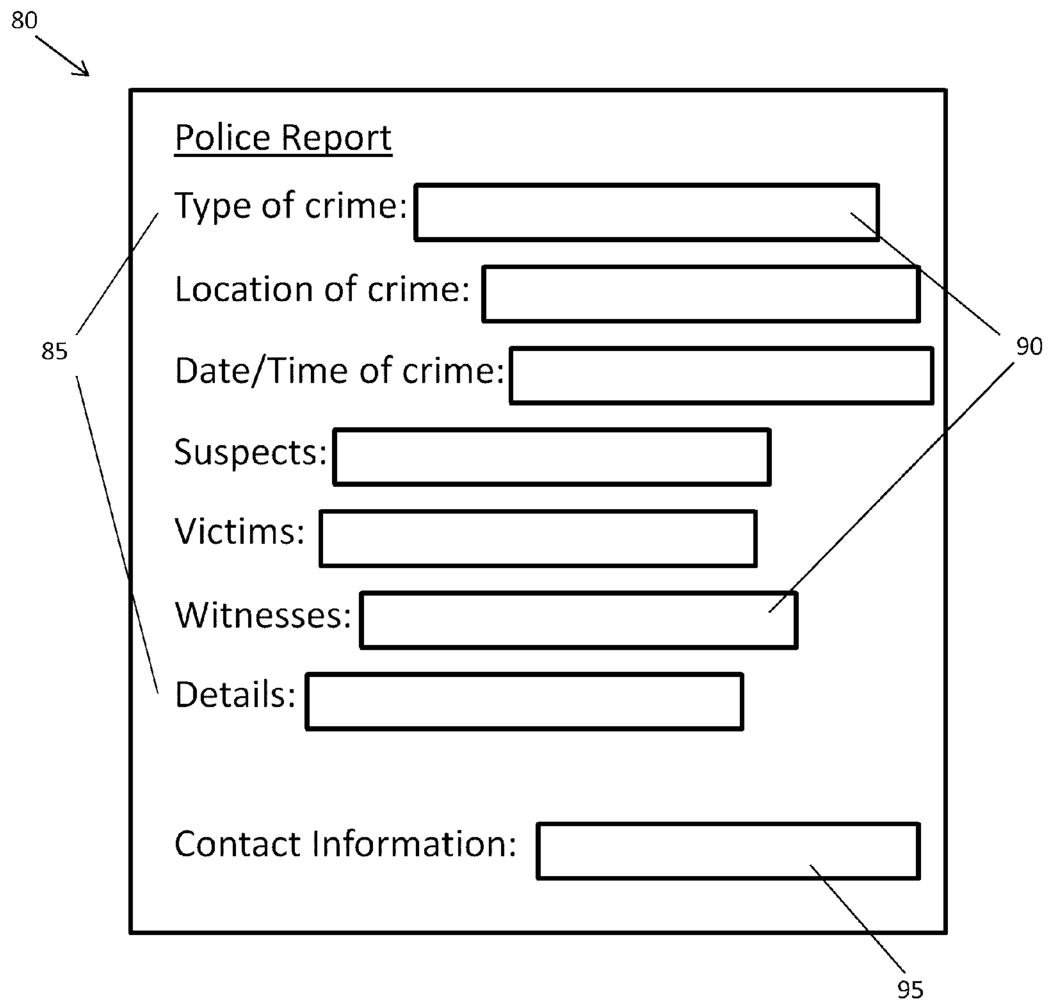
FIG. 3 shows an example of a report in accordance with aspects of the present invention.

As shown in FIG. 3, report 80 enables a user to input information pertaining to a perceived social incident, interest, and/or service. The report 80 may be displayed and implemented by a user via any module or program software such as the reporting module 50 described above with respect to FIG. 1*a*. For example, the report 80 may be generated and presented to the user via the reporting module 50 and the computing device 14 within the client 5 as a template or fillable form with information components 85 that have corresponding fillable text fields 90 for collecting the information or data perceived by the user.

In embodiments, when the beneficiary subscribes to the server, the beneficiary can define the template or fillable form to include any information component 85 that the beneficiary may be interested in receiving from users regarding the social incident, interest, and/or service. In accordance with aspects of the invention, the beneficiary can customize and generate the report 80 on the server using any known mechanism such as a web-based interface and the use of report templates. All information components 85 of the report 80 may be made mandatory or optional depending on the choice of the beneficiary.

In addition to or alternative to the fillable fields 90, the report 80 may be customized to include the ability to collect the information or data from a user via check boxes, radio buttons, drop down menus, data uploads such as still pictures, video recordings, audio recordings, GPS information, automotive event data recordings, etc., and/or text fields. As should be understood by one of ordinary skill in the art, the report 80 can be configured in accordance with aspects of the invention to receive any type of information or data representing information that the beneficiary may be interested in receiving.

In embodiments, the report 80 may also comprise a mechanism 95, e.g., a fillable text field, which allows the user to provide their contact information, e.g., name, telephone number, residential address, email address, etc., such that the beneficiary could contact the user. For example, the beneficiary may wish to contact the user to discuss further details of the information or data already provided in the report 80 or provide the user with a prize or compensation, e.g., a bounty reward, for providing the report 80. The mechanism 95 for recording the contact information of the user may be made mandatory or optional depending on the choice of the beneficiary. However, it should be understood to one of ordinary skill in the art that anonymity is important and assumed to get the cooperation and participation of users.

Flow Diagram

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 4-7 show exemplary flows for performing aspects of the present invention. The steps of FIGS. 4-7 may be implemented in the environments of FIGS. 1*a*, 1*b*, and 2, for example. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
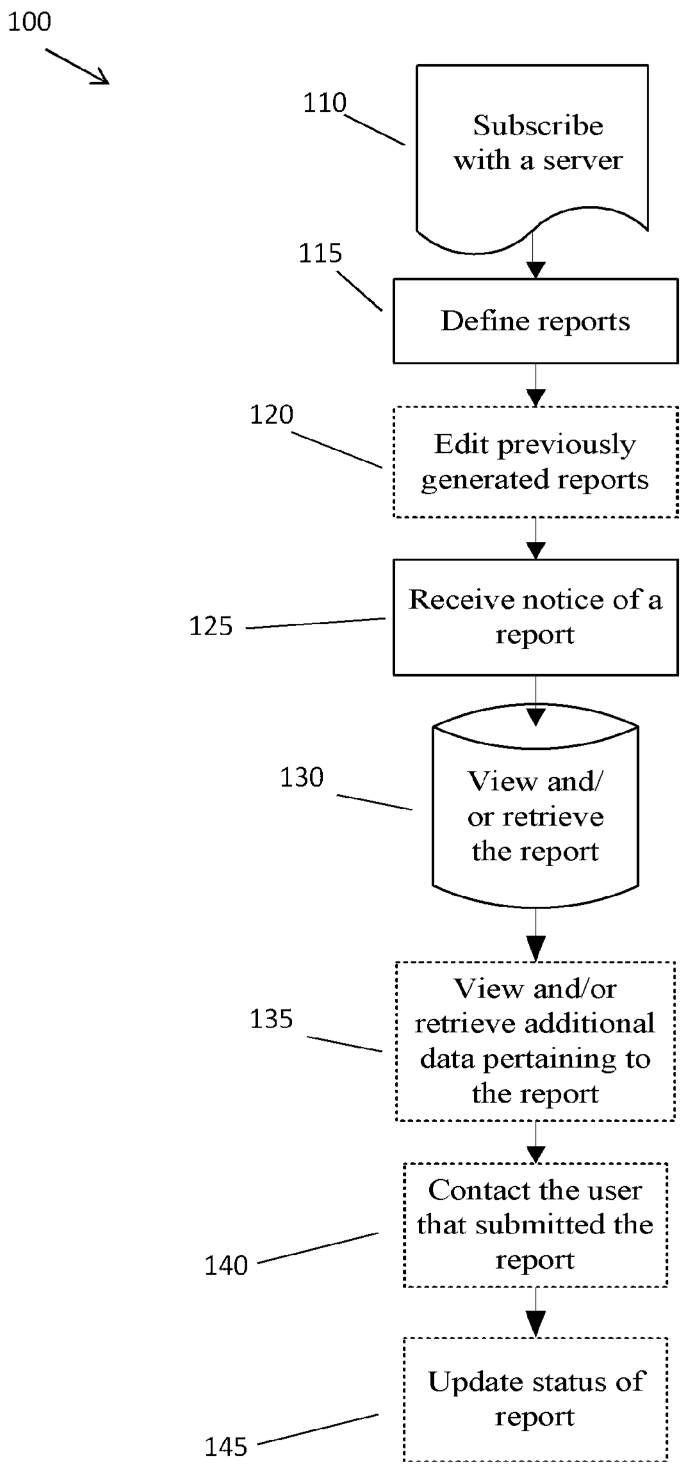
FIGS. 4-7 are illustrative process flows for implementing the system in accordance with aspects of the invention.

FIG. 4 shows a flow diagram depicting steps of a method 100 for a beneficiary to receive reported information and data from the general public with respect to social incidents, interests, and/or services according to aspects of the invention. At step 110, a beneficiary may communicate with the server, e.g., a service provider, and apply or subscribe for an account. In embodiments, this comprises the beneficiary subscribing for a fee-based account with a service provider, e.g., the Reporting Entity, as discussed above. The beneficiary and server may be similar to those described above with respect to FIG. 2, with the request being transmitted as data over the network.

At step 115, the beneficiary defines the type of reports that they are interested in receiving and customizes the reports, as described above with respect to FIG. 3. In embodiments, the beneficiary may access the server and utilize an interface, e.g., a web-based interface, to define types of reports and customize report templates generated by the server to obtain information or data that is of interest to the beneficiary. For example, the beneficiary may be a police station that is interested in collecting information regarding crimes. As such, the police station may define the information components of the report to include the type of crime committed, location the crime took place, the date and time that the crime took place, any witnesses to the crime, any names of the possible suspects, any names of the victims, and any details of the crime, e.g., height and weight of the possible suspects. Optionally, at step 120, the beneficiary may edit any previously generated reports. For example, the police station may decide that their crime reports should include information pertaining to whether the crime may have been racially motivated. Therefore, the police station may edit the report to include a check box for a determination of possible racial motivation behind the crime.

At step 125, the beneficiary receives notice that a report has been received by the server from a user. In embodiments, the beneficiary may receive the notice via email, SMS, or any other type of communication whenever a single report is received or whenever a certain threshold number of reports are received. For example, the notice(s) may be placed into a queue and flagged as "pending" or "new" such as in an email inbox and the beneficiary may check regularly (or may monitor continuously) their queue.

At step 130, the beneficiary may access the server and view and/or retrieve the pending or new report. In some embodiments, the report may be maintained on the server and a hardcopy of the report may be irretrievable from the server by the beneficiary. In other embodiments, a hardcopy of the report may be retrievable, e.g., downloadable, from the server by the beneficiary.

Optionally, at step 135, the beneficiary may request additional information from the server pertaining to the viewed or retrieved report. Alternatively or additionally, the beneficiary may request additional information from the server pertaining to a previously viewed or retrieved report. The additional information may be any type of information that the server is configured to generate and provide to the beneficiary based on received reports, as discussed in further detail below. For example, the server may be configured to process or analyze the crime reports submitted by the general public and plot each of the crimes on a map such that additional information, e.g., a high risk crime area or a pattern of violent crimes that may be linked to a serial killer, can be perceived by the police station beyond the scope of information provided in the reports individually.

Optionally, at step 140, the beneficiary may communicate with the user that submitted the report using the contact information, as described above with respect to FIG. 3. For example, the beneficiary may send an SMS message to the user requesting additional details or information pertaining to their report and/or an associated perception of the social incident, interest, and/or service.

Optionally, at step 145, the beneficiary may update a status of the report. In some embodiments, the status update may be implemented by the beneficiary communicating with the server and providing the server with an update on the status of the report or with a decision that is of concern to the user who submitted the report (e.g., the beneficiary may provide a decision based on the report inputs). In other embodiments, the beneficiary may have their own systems or processes in place that enable the status of received reports to be updated and viewed by the concerned user(s) or by the general public.

Figure 5:
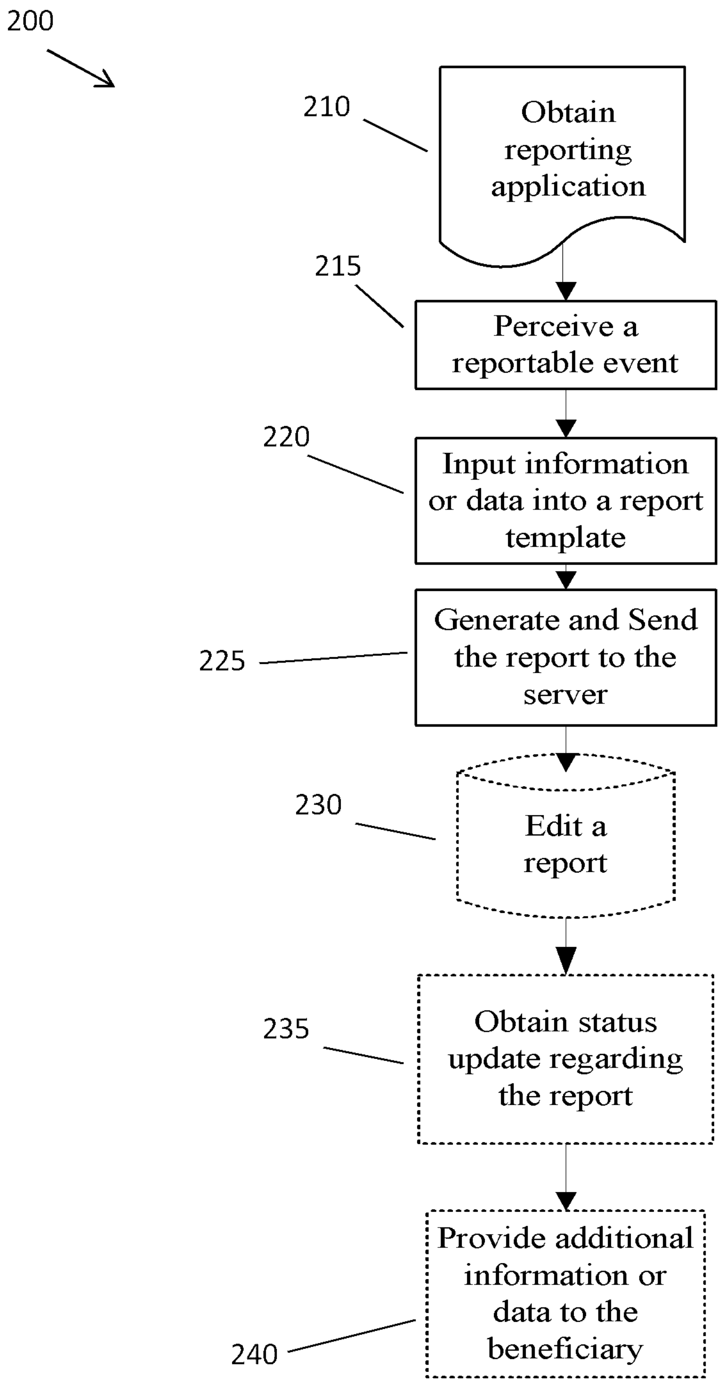

FIG. 5 shows a flow diagram depicting steps of a method 200 for reporting social incidents, interests, and/or services according to aspects of the invention. At step 210, a user requests and obtains a module or program software (e.g., an application) such as the reporting module 50 described above with respect to FIG. 1*a*. For example, the user may download a mobile application to their mobile device from an application store (e.g., the download may be for a fee or free). In embodiments, this may comprise the user receiving a free mobile application or subscribing for a fee-based account with a service provider, e.g., the Reporting Entity, as discussed above. The user and server may be similar to those described above with respect to FIG. 2, with the request and the application being transmitted as data over the network.

At step 215, a user may perceive a reportable event, e.g., a social incident, interest, and/or service that they are interested in reporting to a beneficiary. For example, a user may witness a crime and wish to report the crime to the police. Alternatively, the user may be involved in a car accident and wish to self-report the accident to the authorities, e.g., the police or to other authorities such as his/her car insurer using a pre-installed mobile application, e.g., the reporting module 50. At step 220, the user activates the obtained module or program software and inputs information or data into a report template generated by the obtained module or program software. The report template being specific to or associated with a beneficiary that is interested in receiving such information or data, as described above with respect to FIGS. 3 and 4.

At step 225, the report template generates a finalized report based on the user's input and the report is sent from the user to the server. In embodiments, this comprises the user submitting a completed report to the server (e.g., the server 12) via their computing device (e.g., the client 5). The user and server may be similar to those described above with respect to FIGS. 1*a*, 1*b*, and 2, with the report being transmitted as data over the network. Optionally, at step 230, the user may communicate with the server and edit any previously sent report or add new information. For example, the user may remember a license plate of a vehicle involved in a crime that they had previously reported. Therefore, the user may edit the report to include the additional detail.

Optionally, at step 235, the user may obtain a status of the report. For example, the user may obtain an update as to whether the crime they reported was solved, prosecuted, pending, closed, etc. Alternatively, the user may obtain the decision of the traffic police or insurance company regarding the car accident he/she previously reported. In embodiments, the user may obtain the status of the report from the server and/or directly from the beneficiary, as discussed above with respect to FIG. 4. For example, the user may log into the server or a computing system provided by the beneficiary, and directly obtain any status update of a previously submitted report and/or additional information that the beneficiary chooses to share with the user. Alternatively or additionally, the application on the user's computing device may be configured such that the user can actively download the update from the server, or configured such that the status change is automatically updated, e.g., the application may periodically check with the server for status changes of submitted reports. In embodiments, the server or the application may be configured to provide the user with a notice that the status of the report has been updated.

Additionally in step 235, the user may obtain additional information provided by the server with respect to the submitted report. For example, the server may be configured to generate statistical or analytical information regarding any aspect of the report and/or similar reports and provide the additional information to the user directly or indirectly through other systems that interact with the server.

Optionally, at step 240, the user may communicate with the beneficiary, as described above with respect to FIG. 4. For example, the beneficiary (e.g., through the server) may send an SMS message to the user requesting addition details or information pertaining to their report and associated perception of the social incident, interest, and/or service, and the user may respond via SMS with the requested additional details or information.

Figure 6:
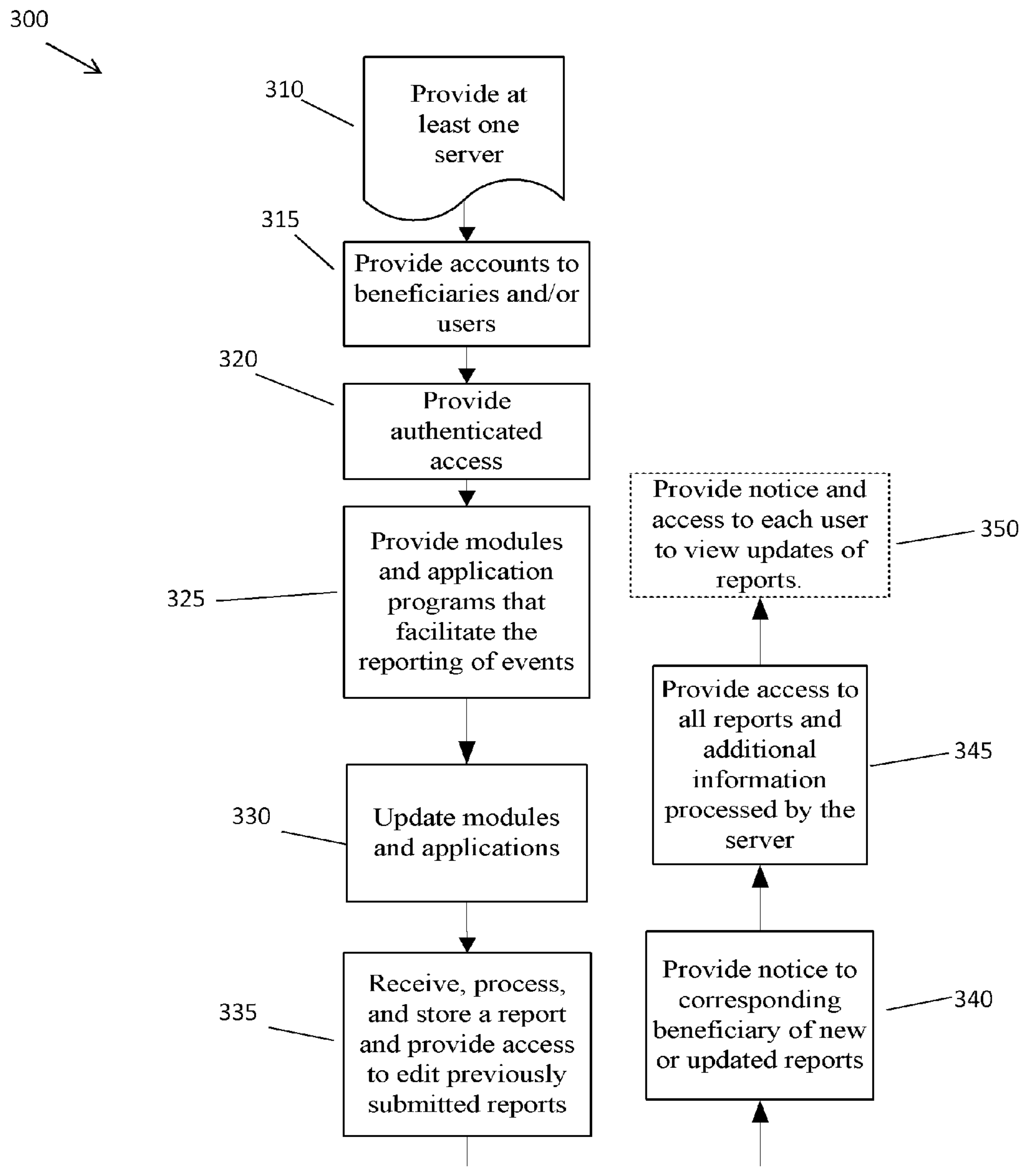

FIG. 6 shows a flow diagram depicting steps of a method 300 for providing a reporting service that enables the general public (or an exclusive group of users) to report social incidents, interests, and/or services to a beneficiary, which could be an authority entity or a group of people interested in such social incidents, interests, and/or services. At step 310, at least one server is provided. For example, a service provider, e.g., the Reporting Entity, may provide at least one server that enables processes of the present invention, as discussed above. The server may be similar to that described above with respect to FIGS. 1*b* and 2, with the server receiving and transmitting data over the network and possibly interacting with other systems.

At step 315, the server may be configured to provide accounts to interested beneficiaries and/or users that wish to avail themselves of the services provided by the server. For example, the server may be configured to provide accounts and issue needed access credentials to beneficiaries interested in obtaining reports of social incidents, interests, and/or services pertaining to their interests, as discussed above with respect to FIG. 4. Additionally, in embodiments, the server may be configured to provide accounts and issue needed access credentials to users that are interested in reporting social incidents, interests, and/or services, as discussed above with respect to FIG. 5.

At step 320, the server may be configured to provide authenticated access for the beneficiaries and/or users. For example, the server may be configured to authenticate access for users and beneficiaries that have set up accounts with the server based on the issued access credentials. Alternatively, the server may employ a third party authentication authority for verifying and authenticating the access credentials issued to the beneficiaries and/or users.

At step 325, the server may be configured to provide modules and application programs that facilitate beneficiaries to generate customizable reports and users to generate and submit reports. In embodiments, the server may be configured to provide a web-based interface with report templates such that the beneficiary can customize their own reports, as discussed above with respect to FIGS. 3 and 4. Additionally, in embodiments, the server may be configured to provide a module or application program to users that are interested in reporting social incidents, interests, and/or services, as discussed above with respect to FIG. 5.

At step 330, the server may be configured to update all modules or application programs provided to users for submitting information or data in the reports. For example, the server may automatically update the client modules or applications provided to users on a periodic basis (e.g., when there is a new update provided on the server) when the users connect to the server (e.g., a push process) to reflect a current list of all account holding beneficiaries and all customized reports associated with the account holding beneficiaries that may be used to submit the information or data. Therefore, the client modules or application programs, e.g., the reporting module 50, are consistently updated to reflect the most up to date list of account holding beneficiaries and associated reports.

For example and in accordance with aspects of the invention, the client component, the reporting module 50, resides in a separate computing device independent of the server component. Consequently, adding or updating a beneficiary is performed by updating only the server side component without the need to update the user side component, e.g., the client. This is possible because the user side component is designed to contact the server side component on a repeated basis (e.g., at regular or non-regular intervals, or every time that the user turns on the application). Synchronization of the current subscribed beneficiaries and associated reports provided in the server can occur at the time of contact between the user side component, e.g., the client, and the server side component. Therefore, the only needed software update for this purpose would be at the server side component, which may be equivalent to registering the new beneficiary and issuing the needed access credentials to the beneficiary.

At step 335, the server may be configured to receive, process, and store newly submitted reports. For example, the server may receive a newly generated report from a user, process the report to obtain any additional information, e.g., statistics or analytics, from the report and/or similar reports, and store the report for later retrieval. In embodiments, the server processes or analyzes the reports in accordance with its configuration and/or terms of service or requirements of each beneficiary associated with the reports. The processing or analysis of the report comprises any action performed by the server on the report to generate new information from the report. The analysis or processing performed by the server is only limited by the configured logic or intelligence of the server. Advantageously, unlimited possibilities of actions based on the server analysis exist due to the ability of the server to connect and communicate with the other systems.

For example, if the server receives a report containing a picture of a suspected missing person, one possibility of processing the report is for the server to compare the received picture to a database of pictures of missing persons and obtain a name or picture of any possible matches. The database may be located locally on the server or on another system at another location known to the server. Additionally, at step 335, the server may be configured to provide access to each user to view and/or edit reports that they have previously submitted, as discussed above with respect to FIG. 5.

At step 340, the server may be configured to provide notice that a new report has been received, as described above with respect to FIG. 4. For example, the server may be configured to send the notice via email, SMS, or any other type of communication whenever a single report is received or whenever a certain threshold number of reports are received. In embodiments, the server is also configured to send a notice when a report is updated by a user, as discussed above with respect to FIG. 5. For example, the server may be configured such that an update to a report triggers another notice to be sent much as described above with respect to newly received reports. Alternatively or additionally, the updated report may be processed or analyzed, linked to the old version of the report, and a new notice sent such that the beneficiary can compare both versions of the reports together.

At step 345, the server may be configured to provide access for each beneficiary to view and/or download all previous and current reports with all information related to each report and all additional information resulting from processing, e.g., statistics or analytics, processed by the server. In embodiments, the beneficiary may only be provided access to reports and related additional information that are associated with the beneficiary. Optionally at step 350, the server may be configured to provide notice to users that a previously submitted report has been updated or the status of the report has changed, and provide access for each user to view the status updates of the reports that they have previously submitted and/or all additional information, e.g., statistics or analytics, processed by the server, as described above with respect to FIG. 5.

Optionally, at step 350, the server may be configured to provide a reporting service to the users and/or general public with respect to submitted reports and the additional data generated by the server from the reports or information resulted from the processing. For example, the server may be configured to report the events that are reported by a user to other users of the server, e.g., account holding users, subscribed users, the public users, or beneficiaries. Further, the server may be configured to allow users and/or the general public to access reports filed by other users and any associated additional data generated by the server. Moreover, the server may be configured to issue a subsequent report to the users in response to a user report, e.g., the server may provide its own analysis of the report and/or any additional feedback provided by the beneficiary as a subsequent report to the users.

Figure 7:
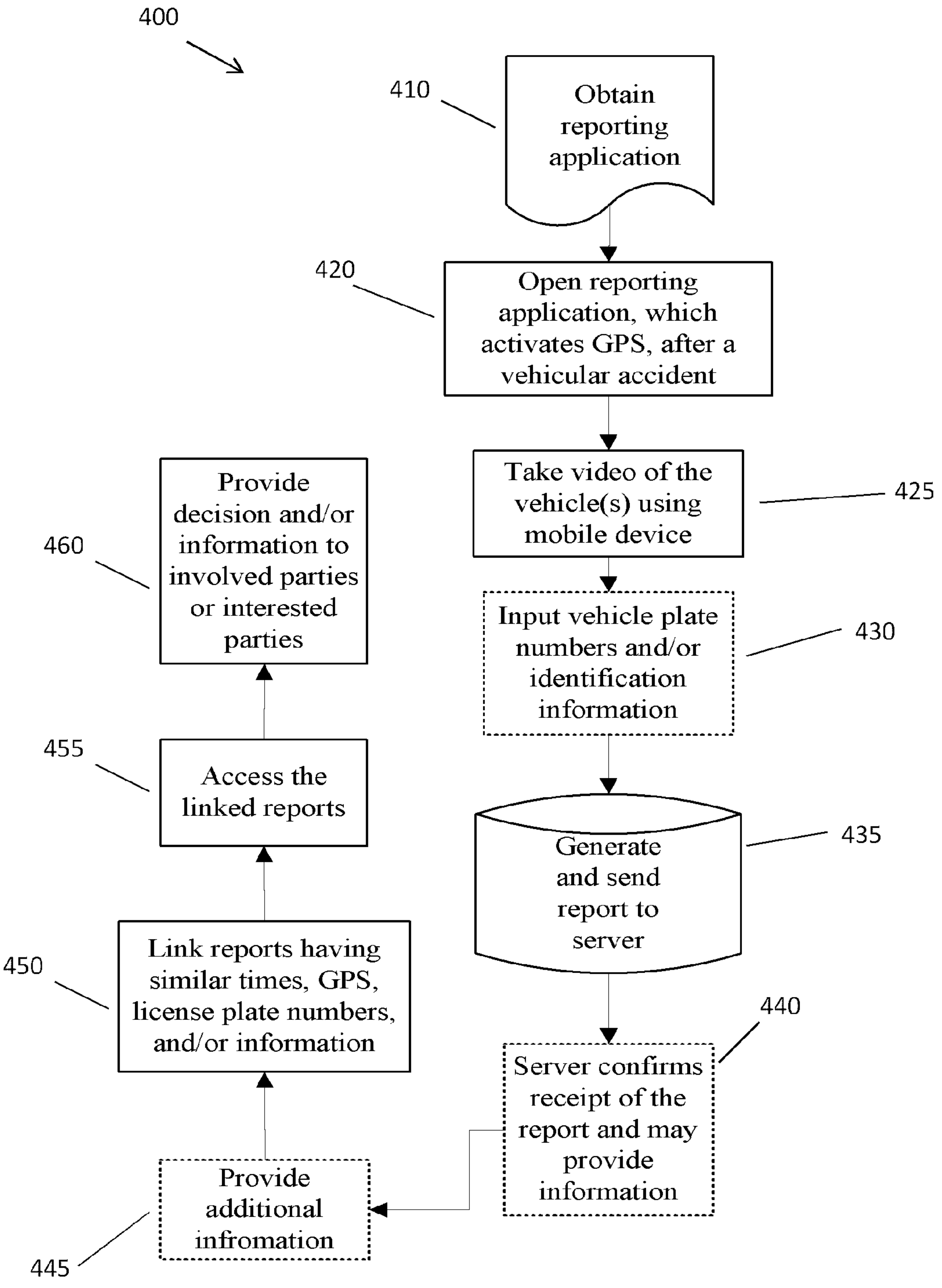

FIG. 7 shows a flow diagram depicting steps of an exemplary method 400 for reporting a vehicular accident according to aspects of the invention. At step 410, a user requests and obtains a module or program software (e.g., an application) such as the reporting module 50 described above with respect to FIG. 1*a*. For example, the user may download a mobile application to their mobile device, as discussed above with respect to FIG. 5. The application may comprise various reporting templates for generating reports that are specific to or associated with a beneficiary that is interested in receiving information or data, as described above with respect to FIGS. 3 and 4.

At step 420, the user activates the application after being involved in a vehicular accident. In embodiments, activation of the application can activate the Global Positioning System (GPS) on the mobile device of the user to provide a location of the accident. Additionally, the user may select via the application a reporting template that is specific to or associated with a beneficiary that is interested in receiving information pertaining to the accident, e.g., the police, an insurance carrier, a repair garage, etc. Furthermore, if another user is involved in the accident, e.g., a passenger in the vehicle of the user or the operator of another vehicle, then that user may also activate the application on their mobile device, which could activate the GPS on their mobile device.

At step 425, each user may take video or still pictures of their vehicle and/or the scene of the accident. For example, each user may exit their vehicle, activate the video camera on their mobile device, and walk around the contour of the scene of the accident while video recording the scene of the accident. At step 430, each user may provide information pertinent to the accident such as the vehicles' plate numbers, each user's identification information, each user's insurance carrier information, each user's contact information, etc. In embodiments, this comprises each user completing at least one reporting template within the activated application via their mobile device.

At step 430, the report may be generated via interaction of each user with the application and their mobile device by associating together the location information determined by the GPS, the video taken using the video recorder, and the information input in the at least one reporting template. For example, (i) each user may upload the video recording of the scene of the accident to the application and/or the at least one reporting template, (ii) the GPS may determine the location of the accident and send this information to the application and/or the at least one reporting template, and (iii) the application and/or the at least one reporting template may associate all of the data into a cohesive report about the accident for each user. Additionally, the report may be transmitted from the mobile device to a server. Each user and server may be similar to those described above with respect to FIGS. 1*a*, 1*b*, and 2, with the report being transmitted as data over the network.

Optionally, at step, 440, the server may send a confirmation message, e.g., an SMS message or an email, to the user's mobile device confirming receipt of the report by the server. In embodiments, the confirmation may direct the user to access a website for adding their version of details surrounding the events of the accident, and to follow up on the status of the report from the beneficiary, e.g., their insurance carrier. Optionally, at step 445, the user may communicate with the server, e.g., via the website, and edit any previously sent report or add new information. For example, the user may remember a license plate of a vehicle involved in the accident that they had previously reported. Therefore, the user may edit the report to include the additional detail.

At step 450, the server may link together all of the reports from multiple users pertaining to the accident. For example, the application may apply a time stamp to the report upon the report being generated and/or sent to the server. The server may utilize the time stamp, the GPS determined location of the accident, the license plates of the vehicles involved in the accident, and/or any additional pertinent information about the accident provided by the multiple users in order to link the reports together.

In accordance with aspects of the invention, the beneficiary may access the linked reports via the server, at step 455. At step 460, the server may provide a decision and/or information to the parties involved in the vehicular accident and/or interested parties, e.g., the police or an insurance carrier. For example, the server may determine a percentage associated with each parties fault in the vehicular accident based on the submitted reports and/or external data pertinent to determining fault in the vehicular accident. The external data may be retrieved from external servers or systems, e.g., servers or systems 70. Additionally, the server may compile statistics for vehicular accidents at that location and provide the statistical information to the parties involved in the vehicular accident and/or the interested parties. Advantageously, the parties involved and/or beneficiary may collect valuable information about vehicular accidents to be utilized in various ways. The valuable information includes statistics, locations, common causes, driver's profiles, etc.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method implemented in a computer infrastructure having computer executable code embodied on a computer readable storage medium having programming instructions, the method comprising the steps of:

subscribing a beneficiary with a server to receive information or data regarding at least one of a social incident, interest, or service of interest to the beneficiary;

defining, by the beneficiary, a template, configured to be displayed on a display screen of a user of the general public that perceived the at least one of the social incident, interest, or service of interest to the beneficiary, to enable the user to prepare a report on the server to capture the information or data; and at least one of viewing or retrieving, by the beneficiary, the report submitted by the user of the general public that perceived the social incident, interest, and/or service of interest to the beneficiary, wherein the defining the template comprises defining at least one information component that the beneficiary may be interested in receiving from the user regarding the at least one of the social incident, interest, or service, and associating the defined template to the beneficiary.

2. The method of claim 1, further comprising receiving notice of a received report or edited report.

3. The method of claim 1, further comprising at least one of viewing or retrieving additional data generated by the server and pertaining to the report.

4. The method of claim 3, wherein the additional data is generated in accordance with terms of service or requirements of the beneficiary.

5. The method of claim 1, further comprising directly contacting the user that submitted the report.

6. The method of claim 1, further comprising updating the status of the report.

7. A method implemented in a computer infrastructure having computer executable code embodied on a computer readable storage medium having programming instructions, the method comprising the steps of:

providing an account to a beneficiary;

providing an application comprising a template defined by the beneficiary, configured to be displayed on a display screen of a user of the general public that perceived at least one of a social incident, interest, or service of interest to the beneficiary, to the user that facilitates reporting of the at least one of the social incident, interest, or service by the user;

receiving a report, by the beneficiary, from the user that includes information or data regarding the at least one of the social incident, interest, or service; and providing access to the report or sending the report to the beneficiary, wherein a computing device is configured to perform the providing the application, the receiving the report, and the providing or sending the report.

8. The method of claim 7, further comprising:

providing access to the beneficiary and facilitating customization of the report by the beneficiary to obtain the information or data regarding the at least one of the social incident, interest, or service; and updating the application to include any new beneficiaries that have been provided an account and any new reports that have been customized by the beneficiary or new beneficiaries.

9. The method of claim 7, further comprising sending a notification to the beneficiary that the report is received.

10. The method of claim 7, further comprising:

processing the report, where the processing comprises analyzing the information or data in the report as well in other reports, and generating additional information related to the information or data in the reports or triggering actions or decisions directly by the server or indirectly manually or by other systems interacting with the server; and providing access to the additional information or sending the additional information to the beneficiary, wherein the additional data is generated in accordance with terms of service or requirements of the beneficiary.

11. The method of claim 7, wherein:

the at least one of the social incident, interest, or service is a vehicular accident and the user is a person involved in the vehicular accident;

the information or data of the report includes contact information of the user, a location of the vehicular accident, a video record of vehicular accident information, and a license plate number of a vehicle of the user involved in the vehicular accident, wherein the report includes the information or data in a report template; and sending the report to a central repository for access by the beneficiary.

12. The method of claim 11, further comprising providing confirmation of receipt of the report, wherein the receipt includes information directing the user to a web site.

13. The method of claim 12, further comprising linking the report to another report based on at least one of a time stamp for the report and the another report, the location information, the license plate numbers, and the contact information, wherein the providing access to the report or sending the report comprises providing access to the linked reports or sending the linked reports to the beneficiary.

14. A system comprising at least one server and a mobile device, wherein the system is configured to:

provide, by a beneficiary subscribed with the at least one server, at least one template, configured by the beneficiary to be displayed on a display screen of a user of the general public that perceived at least one of a social incident, interest, or service of interest to the beneficiary, for obtaining information or data pertaining to at least one of the social incident, interest, and/or or service from the user;

receive, by the beneficiary, a report generated by the user using an application on a client, wherein the application includes the at least one template and the report includes the information or data;

process the information or data included in the report; and provide the report to a beneficiary that specified or required the at least one template.

15. The system of claim 14, wherein the at least one server is further configured to provide an account to the beneficiary, and the at least one template is provided to one or more users of the system.

16. The system of claim 15, wherein the at least one server is further configured to provide authenticated access to the one or more users and the beneficiary.

17. The system of claim 16, wherein the processing the information or data included in the report comprises:

analyzing the information or data, generating additional information related to the information or data in the report and other reports; and triggering actions directly by the at least one server or indirectly via other systems interacting with the at least one server.

18. The system of claim 17, wherein the additional data is generated in accordance with terms of service or requirements of the beneficiary.

19. The system of claim 14, wherein the at least one server is further configured to:

send an application to at least one mobile device of the one or more users, wherein the application is configured to receive input of the information and data, generate the report, and send the report to the server;

synchronize the application with the server such that the application includes a current listing of all beneficiaries subscribed to the at least one server and all reports associated with the beneficiaries; and send a notice of an update status of the report to the application.

20. The system of claim 19, wherein the at least one server is further configured to provide access to the one or more users to view the update status of the report.

* * * * *